United States Patent
Yamada

(10) Patent No.: US 7,883,045 B2
(45) Date of Patent: Feb. 8, 2011

(54) WEBBING RETRACTING DEVICE

(75) Inventor: Kazuhiro Yamada, Aichi-ken (JP)

(73) Assignee: Kabushiki Kaisha Tokai-Rika-Denki-Seisakusho, Aichi-ken (JP)

( * ) Notice: Subject to any disclaimer, the term of this patent is extended or adjusted under 35 U.S.C. 154(b) by 488 days.

(21) Appl. No.: 11/687,311

(22) Filed: Mar. 16, 2007

(65) Prior Publication Data
US 2007/0246592 A1    Oct. 25, 2007

(30) Foreign Application Priority Data
Mar. 20, 2006    (JP) ............... 2006-076703

(51) Int. Cl.
B60R 22/38    (2006.01)
(52) U.S. Cl. .......... 242/383.4; 242/382.2; 242/384
(58) Field of Classification Search .......... 242/383.4, 242/383.2, 383, 382, 389, 396, 371, 370, 242/382.2; 280/806, 807; 297/475–478
See application file for complete search history.

(56) References Cited

U.S. PATENT DOCUMENTS

| | | | |
|---|---|---|---|
| 3,416,747 A | 12/1968 | Stoffel | |
| 3,442,467 A | 5/1969 | Stoffel | |
| 4,422,594 A | 12/1983 | Honl | |
| 4,429,841 A | 2/1984 | Kassai | |
| 4,431,145 A | 2/1984 | Kassai | |
| 4,452,405 A | 6/1984 | Adomeit | |
| 4,506,844 A * | 3/1985 | Ernst | 242/376.1 |
| 4,619,418 A * | 10/1986 | Butenop | 242/382.6 |
| 5,622,327 A * | 4/1997 | Heath et al. | 242/383.4 |
| 6,155,513 A * | 12/2000 | Smithson | 242/383.2 |
| 6,523,771 B2 * | 2/2003 | Sumiyashiki | 242/383.2 |
| 6,527,214 B2 * | 3/2003 | Sumiyashiki | 242/383.2 |
| 6,530,536 B2 * | 3/2003 | Sumiyashiki et al. | 242/383.2 |
| 6,585,184 B1 * | 7/2003 | Park et al. | 242/383.2 |
| 6,732,967 B2 * | 5/2004 | Sumiyashiki | 242/376 |
| 6,883,742 B2 * | 4/2005 | Sumiyashiki et al. | 242/383.1 |
| 7,562,840 B2 * | 7/2009 | Takamatsu et al. | 242/383.1 |
| 2008/0191083 A1 * | 8/2008 | Sumiyashiki | 242/382.2 |

(Continued)

FOREIGN PATENT DOCUMENTS

DE    4416200 A1    7/1995

(Continued)

Primary Examiner—Michael R Mansen
Assistant Examiner—Juan J Campos
(74) Attorney, Agent, or Firm—Roberts Mlotkowski Safran & Cole, P.C.; Thomas W. Cole

(57) ABSTRACT

An inertial (mass) body is relatively rotatably provided on a V gear. Further, a ring is provided at the outer peripheral side of the V gear so as to be rotatable and displacable in the rotational radial direction of the V gear. When the V gear is suddenly rotated with a spool, the mass relatively pivots to the side opposite to the side of the pull out direction, and displaces to the outside in the rotational radial direction of the V gear. By doing so, an inner peripheral portion of the ring contacts with an outer peripheral portion of the V gear, and the ring rotates with the V gear. Due to this a pressing portion provided at an outer peripheral portion of the ring displaces an interlocking pawl, meshing the interlocking pawl with ratchet teeth on an outer peripheral portion of the V gear.

5 Claims, 10 Drawing Sheets

U.S. PATENT DOCUMENTS

2008/0210802 A1* 9/2008 Sumiyashiki ............ 242/379.1

FOREIGN PATENT DOCUMENTS

| | | | |
|---|---|---|---|
| DE | 29820090 | U1 | 4/1999 |
| EP | 0124633 | A1 | 11/1984 |
| GB | 2155305 | A | 9/1985 |
| JP | 5-208655 | A | 8/1993 |

* cited by examiner

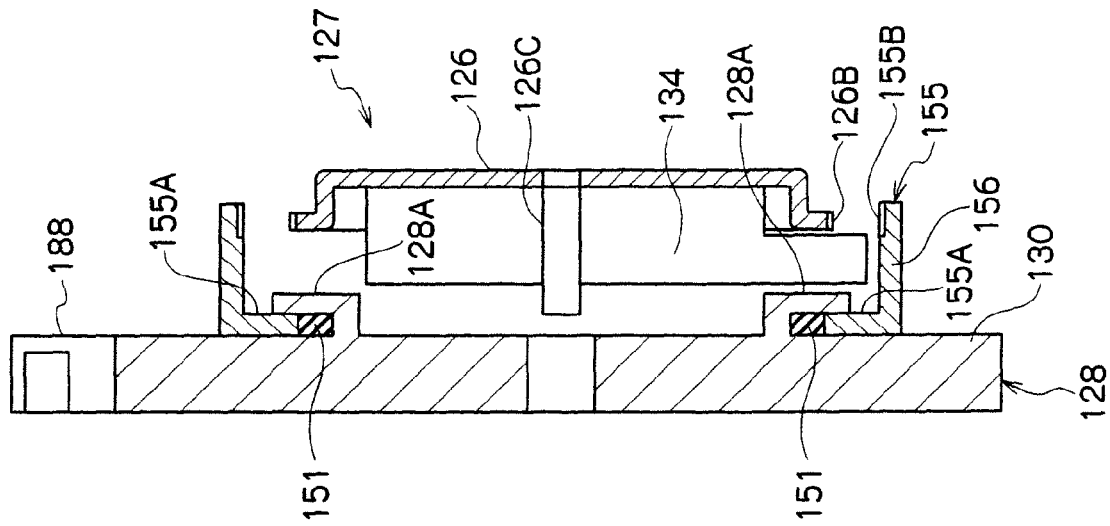
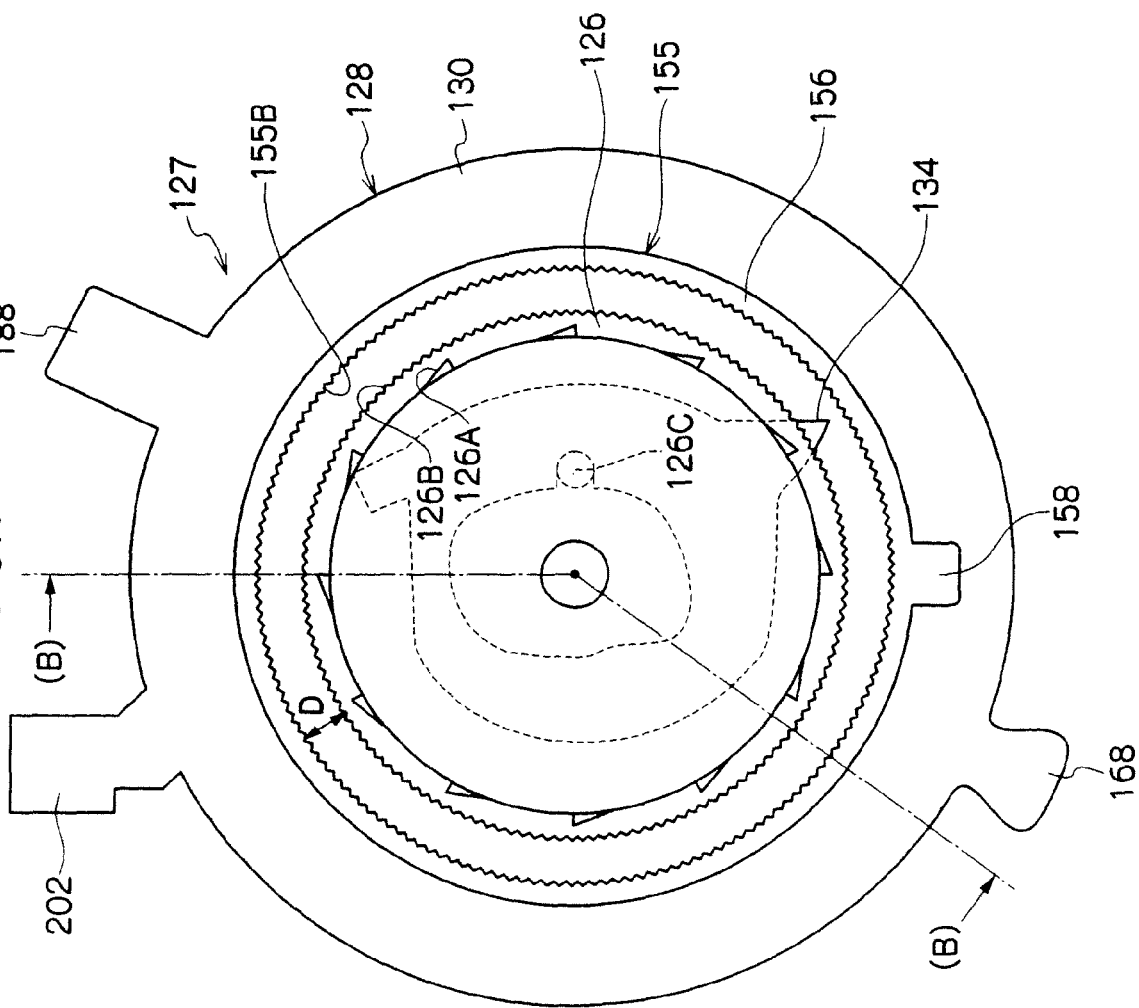

F I G 8
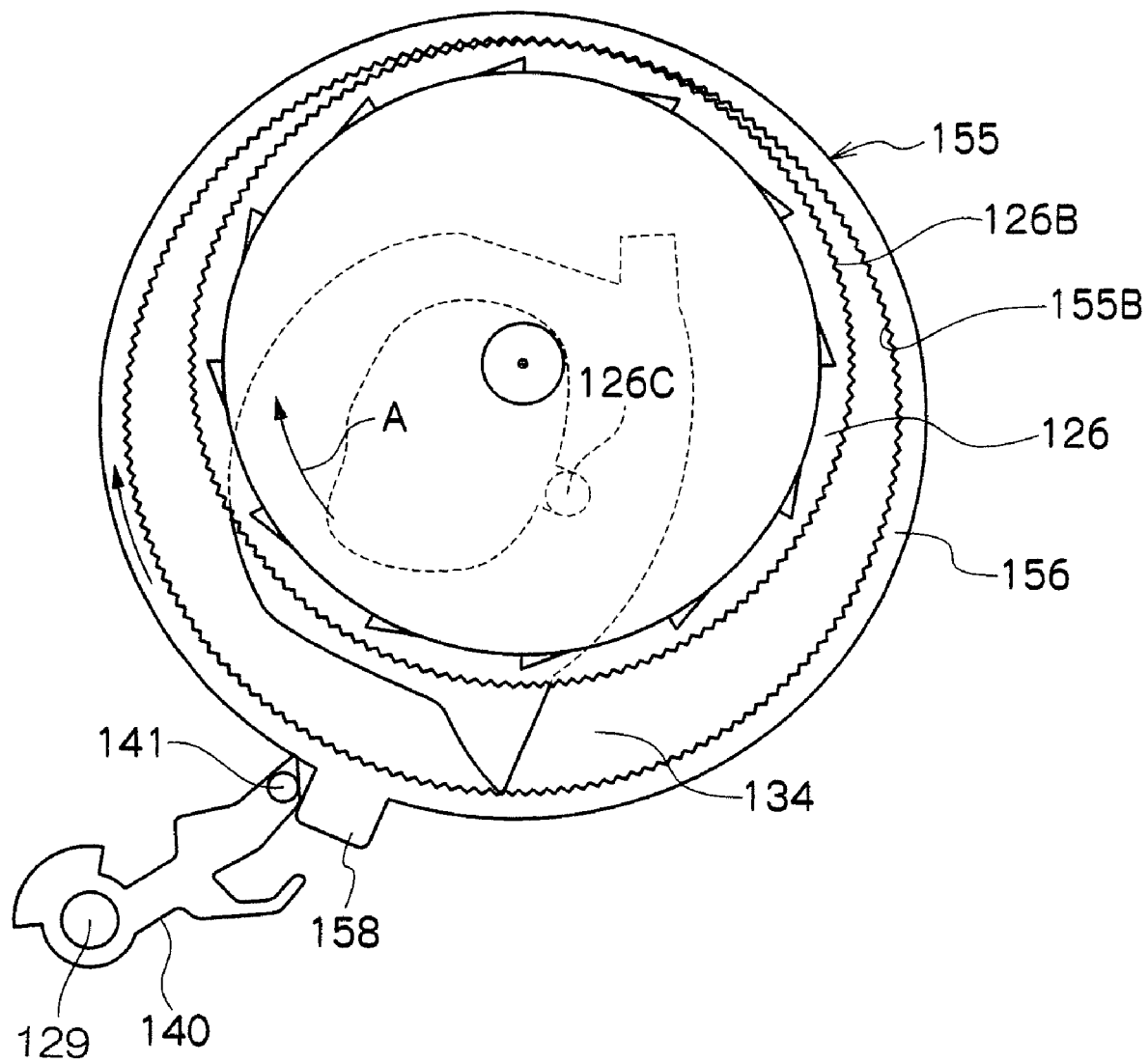

WEBBING RETRACTING DEVICE

CROSS-REFERENCE TO RELATED APPLICATION

This application claims priority under 35 U.S.C. 119 from Japanese Patent Application No. 2006-076703, the disclosure of which is incorporated by reference herein.

BACKGROUND OF THE INVENTION

1. Field of the Invention

The present invention relates to a webbing retracting device that takes up and stores a long band-shaped webbing belt that restrains the body of an occupant of a vehicle.

2. Description of the Related Art

Seatbelt devices for restraining the body of an occupant by a long band-shaped webbing belt are provided with a webbing retracting device. Such a webbing retracting device is provided with a spool. The webbing belt is attached to the spool at a longitudinal direction proximal end side thereof, and when the spool is rotated in a take up direction around its axis, the webbing belt is wound up from the proximal end side and stored on the spool.

In a webbing retracting device, a lock mechanism is provided for locking the spool when there is a sudden vehicle deceleration or the like, restricting pull out of the webbing belt, and holding the body of an occupant attempting to move in a direction that is substantially toward the front of the vehicle (see, for example, Japanese Patent Application Laid-Open (JP-A) No. 5-208655).

In the webbing retracting device disclosed in JP-A No. 5-208655, a lock gear is provided that is rotatable coaxially with respect to a reel shaft (spool). Between the lock gear and the spool, a pawl (interlocking member) interlocks the lock gear and the spool, and when the spool relatively rotates with respect to the lock gear in the webbing pull out direction, the interlocking member is displaced toward the outside in the rotational radial direction of the spool, and mesh with a ratchet of internal teeth formed on a frame. In this way the spool is locked and rotation of the spool when the webbing belt is pulled out is restricted.

Furthermore, in the lock gear there is an inertial member (mass) supported so as to be able to relatively pivot with respect to the lock gear, and when the lock gear rotates at a normal speed the mass follows and rotates. However, when the lock gear is rotated suddenly the mass undergoes inertial movement and relatively pivots with respect to the lock gear, displacing toward the outside in the lock gear rotational radial direction, meshing with the ratchet of internal teeth formed on the frame. By doing so, the lock gear is locked and only the spool rotates.

That is, in normal pulling out and taking up of a webbing belt, the lock gear rotates, following with respect to the rotation of the spool. However, under conditions of sudden deceleration, the body of an occupant moves in a substantially forward direction, and due to this, the webbing belt is pulled out suddenly, and, when the spool is rotated suddenly in the pull out direction, the lock gear locks, and the spool rotates in the pull out direction with respect to the lock gear. By doing so, as described above, the interlocking member meshes with the ratchet of the frame, the spool is locked, and pulling out of the webbing belt is restricted.

Here, the mechanism is complicated for detecting the condition in which the webbing belt is pulled out suddenly from the spool, with an interlocking member being used in order to couple the spool and the lock gear rotation, and a joint pin being used to interlock the pawl to the spool and to the lock gear, and guide grooves being formed to guide the lock pawl and joint pin to the spool and the lock gear, and so on. This has the problem that the cost is high.

SUMMARY OF THE INVENTION

The present invention considers the above circumstances and has an object of simplifying and reducing the cost relative to conventional webbing retracting devices with a mechanism for detecting the condition in which webbing belt is pulled out suddenly from a spool.

A first aspect of the invention is a webbing retracting device including: a spool having a proximal end portion of a long band-shaped webbing belt attached thereto, the spool taking up and storing the webbing belt when rotated in a take up direction that is one direction about the spool axis, and the webbing belt being pulled out by pulling the webbing belt toward the distal end side thereof such that the spool is rotated in a pull out direction that is a direction opposite to the take up direction; a first rotational body, the first rotational body being coaxially rotatable with the spool; a ring member having the first rotational body provided at an inner peripheral side thereof, the ring member being rotatable and being able to displace between a separation position, in which an inner peripheral portion of the ring member is separated from an outer peripheral portion of the first rotational body, and a contact position, in which the inner peripheral portion of the ring member is in contact with the outer peripheral portion of the first rotational body; a ring member moving mechanism that is actuated by sudden rotation of the spool in the pull out direction, and moves the ring member from the separation position to the contact position; a second rotational body that is coaxially relatively rotatable with respect to the spool; an interlocking member provided on the second rotational body and configured to displace between a position of direct or indirect engagement with the spool and a position in which the engagement is released, the interlocking member coupling to the ring member rotating in the pull out direction, directly or indirectly engaging with the spool and rotating the second rotational body with the spool rotating in the pull out direction; and a lock member that couples to the second rotational body rotating in the pull out direction and directly or indirectly engages with the spool, restricting rotation of the spool in the pull out direction.

In the webbing retracting device of the above aspect, when the webbing belt taken up and stored on the spool is pulled toward the distal end side, the spool rotates in the pull out direction and the webbing belt wound up on the spool is pulled out. The webbing belt pulled out in such a manner is placed around the body of an occupant, and, for example, by retaining a tongue plate provided on the webbing belt in a buckle device provided at the side of a vehicle seat, the body of the occupant wears the webbing belt, and the body of the occupant is restrained by the webbing belt.

In such a state, when, for example, the vehicle decelerates, the body of the occupant attempts to suddenly inertially move in a direction substantially toward the front of the vehicle, and the webbing belt placed around the body of an occupant is pulled suddenly, and the spool rotates suddenly in the pull out direction. When the spool rotates in the pull out direction in such a manner the ring member moving mechanism is actuated. By the actuation of the ring member moving mechanism the ring member is moved from the above separation position to the above contact position.

By this movement, friction and meshing occurs between the ring member and the first rotational body at the contact portion therebetween, the ring member rotates with the first rotational body in the pull out direction, and the interlocking member is coupled. The actuated interlocking member is directly or indirectly engaged with respect to the spool, and rotates the second rotational body with the spool that is rotating in the pull out direction. The lock member is coupled to the second rotational body that is rotating in the pull out direction. The actuated lock member engages directly or indirectly with the spool, and restricts rotation of the spool in the pull out direction. By doing so, as described above, by the webbing placed around the body of the occupant, the body of the occupant is restrained with certainty, and movement of the body of the occupant substantially toward the vehicle front side by inertia is restricted.

Here, in the webbing retracting device of the above aspect of the invention, for the coupling of the interlocking device to the rotation of the first rotational body, it is sufficient simply to control the displacement of the ring member in the rotational radial direction of the first rotational body, therefore, the mechanism for detecting the condition in which webbing belt is pulled out suddenly from the spool may be simplified and reduced in cost, when compared with conventional webbing retracting devices.

In the above aspect, the ring member moving mechanism may be configured with a mass (inertial body) that in the inertial movement condition, due to the sudden rotation of the first rotational body, moves the ring member from the separation position to the contact position.

In the webbing retracting device of the above configuration, when the spool and the first rotational body suddenly rotate, the mass becomes in an inertial movement condition and moves the ring member from the above separation position to the above contact position. By doing so, the ring member rotates in the pull out direction with the first rotational body, and the interlocking member is coupled and rotates the second rotational body in the pull out direction. In doing so, the lock member directly or indirectly engages with the spool, and restricts the rotation of the spool in the pull out direction, therefore, as described above, by the webbing placed around the body of the occupant, the body of the occupant is restrained with certainty, and movement of the body of the occupant substantially toward the vehicle front side by inertia is restricted.

Here, in the webbing retracting device according to the above configuration of the invention, by the use of a mass, as used in conventional webbing retracting devices, for the mechanism for controlling the displacement of the ring member in the rotational radial direction of the first rotational body, an increase in the number of parts is prevented when providing the mechanism, and the overall number of parts of the webbing retracting device as a whole may be reduced, as compared to conventional webbing retracting devices.

Furthermore, in the webbing retracting device of the above configuration, it may be configured such that the mass is supported so as to be relatively pivotable with respect to the first rotational body, and, in the inertial movement condition, the mass relatively pivots with respect to the first rotational body, and displaces toward the outside in the first rotational body rotational radial direction, and moves the ring member to the contact position, and when not in the inertial movement condition, the mass is not capable of relative pivoting with respect to the first rotational body, and is not displaceable toward the outside in the first rotational body rotational radial direction.

In such a configuration of webbing retracting device, in the inertial movement condition the mass relatively pivots with respect to the first rotational body, and displaces toward the outside in the first rotational body rotational radial direction, and moves the ring member to the contact position. In so doing, the ring member rotates with the first rotational body in the pull out direction, the interlocking member is activated and the second rotational body is rotated in the pull out direction. By this action the lock member directly or indirectly engages with the spool, and restricts the rotation of the spool in the pull out direction.

In contrast, when not in the inertial movement condition, since the mass becomes not able to relatively pivot with respect to the first rotational body, and not able to displace toward the outside in the rotational radial direction of the first rotational body, the ring member remains in the above separation position. By doing so, the interlocking member is not actuated, and the spool is able to rotate freely.

Further, in the above configuration of webbing retracting device, the ring member moving mechanism may include a mass biasing member, biasing the mass in the pull out direction.

Also, in the above configuration of webbing retracting device, by the mass being biased by a biasing member to the pull out direction, when the spool and the first rotational body rotate at normal speeds, the mass rotates following the rotation of the first rotational body and the mass becomes in the above non inertial movement condition, and the spool is able to rotate freely.

Furthermore, in the webbing retracting device of the above aspect, the ring member moving mechanism may include a ring member biasing member, biasing the ring member toward the inside in the rotational radial direction.

In the webbing retracting device according to the above configuration, since the ring member is biased inward in the rotational radial direction by the ring member biasing member, the ring member, after being displaced by sudden rotation of the spool and the first rotational body, may return to its initial position.

As explained above, in the webbing retracting device of the present invention the mechanism for detecting the condition of webbing belt being pulled out suddenly from the spool is simplified and reduced in cost, compared to conventional webbing retracting devices.

BRIEF DESCRIPTION OF THE DRAWINGS

FIGS. 5A and 5B are diagrams showing the configuration of a main portion of a webbing retracting device according to an embodiment of the present invention, FIG. 5A is a plan view, FIG. 5B is a cross-sectional diagram.

FIG. 8 is a front view showing a displaced state of the interlocking member due to due to the rotation of the ring corresponding to FIG. 6.

DETAILED DESCRIPTION

Figure 1:
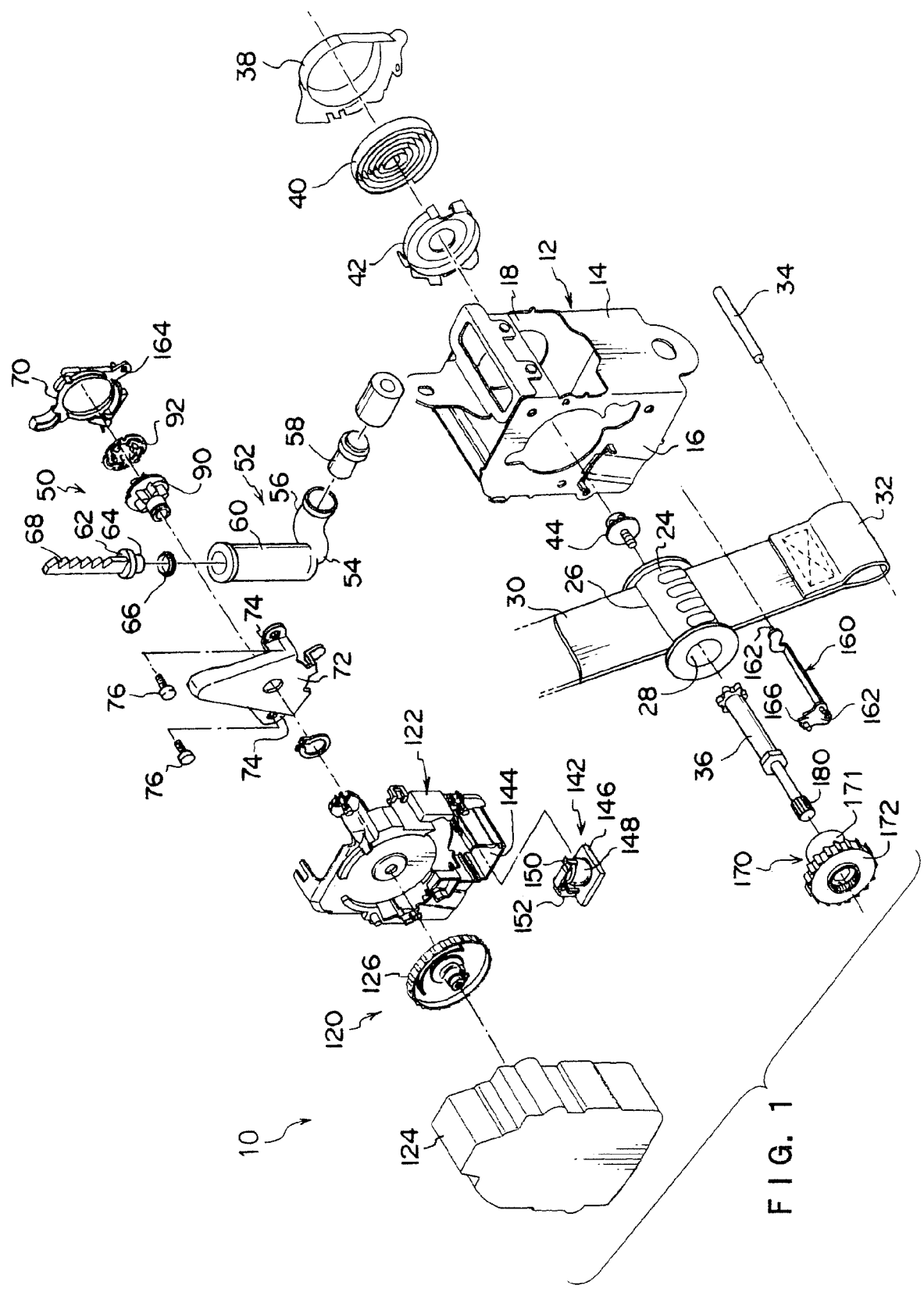
FIG. 1 is an exploded perspective diagram showing an outline of the overall configuration of a webbing retracting device according to an embodiment of the present invention.

FIG. 1 is an exploded perspective diagram showing an outline of the overall configuration of the present webbing retracting device 10. As can be seen in the figure, the webbing retracting device 10 is provided with a frame 12.

The frame 12 is, for example, provided with a back plate 14 that is a plate shape with thickness direction thereof that is substantially along the left-right direction of a vehicle. The present webbing retracting device 10 is a structure that is attached to a vehicle body, by the back plate 14 being fixed with fasteners, such as bolts or the like, for example, to a vehicle body in the vicinity of a lower end of a center pillar.

A leg plate 16 is formed from one width direction side of the back plate 14 which is along the substantially vehicle front-back direction, bent around toward the inside width direction of the vehicle (substantially the vehicle left-right direction). Also, a leg plate 18 is formed at the other width direction side of the back plate 14, bent around in the same direction as leg plate 16 is formed.

Between the leg plate 16 and the leg plate 18 is provided a spool 24. The spool 24 is formed as a substantially cylindrical shape with an axial direction that is along the direction of opposition of the leg plate 16 and the leg plate 18.

There is an insertion hole 26, with both ends thereof opening at outer peripheral portions of the spool 24, and the shape of the openings being slit shapes that have length directions in the spool 24 axial direction. The insertion hole 26 is formed so as to avoid a through hole 28 that penetrates the axial portion of spool 24, and one of the length-wise ends of a long band-shaped webbing belt 30 is inserted through from one of the opening ends of the insertion hole 26.

At a proximal end portion in the length-wise direction of the webbing belt 30 is formed a cylindrical shaped portion 32, with a through hole in the width direction of the webbing belt 30, and, by disposing a detachment prevention shaft 34 at the inside of the cylindrical shaped portion 32 that has been inserted through the insertion hole 26, when the webbing belt 30 is pulled toward the distal end side, the proximal end of the webbing belt 30 is prevented from being pulled out of the insertion hole 26.

The webbing belt 30, prevented from detachment from the insertion hole 26 in such a way, is stored by being taken up by winding up in layers from the proximal end thereof onto the outer peripheral portion of the spool 24, by rotation of the spool 24 in the take up direction that is one of the directions of rotation around the axis of the spool 24.

On the inside of through hole 28 is disposed a bar-shaped torsion shaft 36 with a length direction in the axial direction of the spool 24. The torsion shaft 36 is interlocked with the spool 24 in a state in which pivoting around the axial rotation direction inside of the spool 24 at the leg plate 18 side is prevented. Furthermore, the end portion of the torsion shaft 36 on the leg plate 18 side passes through the leg plate 18 and protrudes to the outside of the frame 12.

A spring cover 38 is disposed on the outside of the leg plate 18. The spring cover 38 is of a case-shape which is open facing the inside of leg plate 18, and the spring cover 38 is fixed to the leg plate 18 by fasteners such as screws or the like and/or fitting together of fitment lugs or the like formed on the spring cover 38 or on the leg plate 18.

A spiral spring 40 is stored on the inside of the spring cover 38. The spiral spring 40 is of a construction such that there is a gradual increase in a biasing force thereof when the inside end in the spiral winding direction is rotationally displaced in a pull out direction relative to the outside end in the spiral winding direction, the pull out direction being the opposite direction to the above take up direction. The outside end in the spiral winding direction of the spiral spring 40 is attached to a spring seat 42 that is provided to the opening side of the spring cover 38.

The spring seat 42 is fixed to the spring cover 38, and the outside end in the spiral winding direction of the spiral spring 40 is interlocked with the leg plate 18 (frame 12) via the spring seat 42 and the spring cover 38. Furthermore, an adapter 44 is provided in the vicinity of the inside end in the spiral winding direction of the spiral spring 40.

The inside end in the spiral winding direction of the spiral spring 40 is fixed to an outside peripheral portion of the adapter 44. Furthermore, the leg plate 18 side end portion of the torsion shaft 36, which passes through the spring seat 42, is fitted into and fixed at the axial portion of the adapter 44.

A pre-tensioner 50 is provided at the outside of the leg plate 16. The pre-tensioner 50 is provided with a cylinder 52.

In the present embodiment the cylinder 52 is, for example, a metal pipe provided with a bent portion 54 at a middle portion thereof in the axial direction, formed by plastically deforming the cross-sectional shape in an appropriate manner while maintaining the internal communication therein, and bending as appropriate. At one side in the axial direction of the bent portion 54 is an attachment portion 56. A gas generator 58 is attached at an open end of the attachment portion 56.

The gas generator 58 is connected electrically or mechanically to an unillustrated acceleration sensor, and when the acceleration sensor detects a degree of acceleration (deceleration) that occurs when a vehicle is in a state of suddenly decreasing velocity, gas generating agent provided in an internal portion of the gas generator 58 is ignited. By this action, the gas generating agent burns in an extremely short period of time and instantaneously generates gas.

A cylinder body 60 is provided at the side of the bent portion 54 that is opposite to the side of the attachment portion 56. Since the bent portion 54 is bent in the above manner by plastically deformation while maintaining the internal communication therein, gas generated in the gas generator 58 attached to the attachment portion 56 is supplied into the bottom portion side of the cylinder body 60. Also, a piston 62 is provided on the inside of the cylinder body 60.

The piston 62 is formed into a circular plate shape that has approximately the same (to be precise slightly smaller) external dimension as the internal diameter of the cylinder body 60. A retaining portion 64 is integrally and coaxially formed to the piston 62 at the face of the piston 62 that faces toward the bottom portion side of the cylinder body 60. The retaining portion 64 has an external dimension that is a smaller diameter than that of the piston 62 and a sealing member 66 is fitted over an outer peripheral portion of the retaining portion 64.

The sealing member 66 is formed in a ring shape and also has elasticity, and when in a state in which the piston 62 is disposed on the inside of the cylinder body 60, the sealing member 66 elastically presses against an outer peripheral portion of the retaining portion 64 and the inner peripheral portion of the cylinder body 60, and seals the space between the retaining portion 64 and the cylinder body 60. Due to this, when gas is supplied into the cylinder body 60 and the internal pressure of the cylinder body 60 increases, the piston 62 slides in the direction toward the top end side of the cylinder body 60.

A rack bar 68 is formed as a sliding member on the opposite side of the piston 62 to the side of the retaining portion 64 (that is, on the open end side of the cylinder body 60). The rack bar 68 has a square bar shape that is long along the direction of opening of the cylinder body 60, and the on one side in the width direction plural rack teeth are formed with a uniform spacing therebetween along the rack bar 68 length direction.

Also, a gear case 70 is provided at the vicinity of the opening end of the cylinder body 60 on the leg plate 16 side, and a cover plate 72 is provided on the opposite side of the cylinder body 60 to the side of the gear case 70.

The cover plate 72 is formed in a case shape that can cover the rack bar 68, which has protruded from the cylinder body 60, from the side opposite to that of the leg plate 16 of the cylinder body 60, and the cover plate 72 is formed in a shape so that at least it does not interfere with the rack bar 68 protruded from the open end of the cylinder body 60. Also, the structure is such that there are plural fastening lugs 74 formed on outer peripheral portions of the cover plate 72, and the fastening lugs 74 are fixed to the leg plate 16 by screws 76, so that the cover plate 72 is fixed to the frame 12.

Furthermore, on the cover plate 72 there are unillustrated retaining portions for fitting to the open end of the cylinder body 60 and the vicinity thereof, and in such a manner the cover plate 72 is connected to the cylinder body 60. A pinion 90 is disposed between the cover plate 72 and the gear case 70.

The structure is such that the pinion 90 is meshed with the rack teeth of the distal end of the rack bar 68, and the pinion 90 is also axially rotatably supported at one end of the torsion shaft 36 that penetrates through the leg plate 16 and the gear case 70, and when the rack bar 68 moves upward the pinion 90 rotates in the take up direction.

Also, a clutch 92 is provided on the leg plate 16 side end of the pinion 90. The clutch 92 is rotatably axially supported at the torsion shaft 36, and therefore even when the torsion shaft 36 rotates the clutch 92 does not rotate. However, the clutch 92 is engaged with the pinion 90 and so when the pinion 90 rotates in the take up direction, a portion of the clutch 92 deforms and couples to the torsion shaft 36.

Also, a lock mechanism 120 is provided on the side of the leg plate 16. The lock mechanism 120 is provided with a sensor holder 122. The sensor holder 122 is formed partially in a concave shape that is open facing toward the leg plate 16 side, and a portion of the cover plate 72 is located to the inside of the portion opening toward the leg plate 16 side.

Around the outer periphery of the sensor holder 122 are formed cylindrical shaped protrusions that protrude toward the leg plate 16 side at predetermined positions, and in a state in which these protrusions are pressed into hole portions formed on the leg plate 16 side, by pressing "push-fit pins" into the inside of these protrusions the sensor holder 122 is fixed to the leg plate 16.

A sensor cover 124 is provided on the side of the sensor holder 122 that is opposite to the side of the leg plate 16. The sensor cover 124 has fixing claws or the like provided at outer peripheral portions thereof, and these fit together with predetermined positions of the sensor holder 122 so that the sensor cover 124 is mechanically connected to the sensor holder 122. An unillustrated cylindrical shaft receiving portion is formed on the sensor cover 124, rotatably axially supporting a portion at the other end of the torsion shaft 36 that has passed through the sensor holder 122.

A V gear 126 is provided as a first rotating body between the sensor holder 122 and the sensor cover 124. The V gear 126 is formed with a shallow bottomed cylindrical shape (or saucer shape) opening facing toward the sensor cover 124 side, and ratchet teeth 126A are formed intermittently at an outer peripheral portions on the V gear 126 on the sensor holder 122 side, and ratchet teeth 126B are formed continuously at an outer peripheral portion on the V gear 126 on the sensor cover 124 side. The torsion shaft 36 passes through the V gear 126, and the V gear 126 is attached to the torsion shaft 36 such that it is able to rotate integrally with the torsion shaft 36 about the same axis.

A sensor gear 128 is provided as a second rotating body on the sensor cover 124 side of the V gear 126. The torsion shaft 36 passes through coaxially at the body 130 of the sensor gear 128. The body 130 of the sensor gear 128 is rotatably axially supported by the torsion shaft 36.

A portion of the sensor gear 128 is engaged with an end of a return spring 132. The return spring 132 is a tension coil spring, the other end thereof being attached to the sensor cover 124, and the return spring 132 biasing the sensor gear 128 in the take up direction when the sensor gear 128 is rotated in the pull out direction around the torsion shaft 36.

A long pressing portion 168 is formed at the body 130 of the sensor gear 128 facing toward the V gear 126 side. A shaft 129 is formed to protrude from an end portion at the other side of the pressing portion 168 to the side of the V gear 126, and an interlocking pawl 140 as an interlocking member is axially supported by the pressing portion 168 so as to be pivotable around an axis that is parallel to (in the same direction as) the axial direction of the torsion shaft 36.

The interlocking pawl 140, by pivoting, contacts or moves away from the above outer peripheral portion of the V gear 126, and in the state in which the interlocking pawl 140 approaches and engages with the outer peripheral portion of the V gear 126, if the V gear 126 is rotated in the pull out direction, the rotation of the V gear 126 in the pull out direction is transmitted to the sensor gear 128 via the interlocking pawl 140, and the sensor gear 128 rotates with the V gear 126 in the pull out direction.

Figure 2:
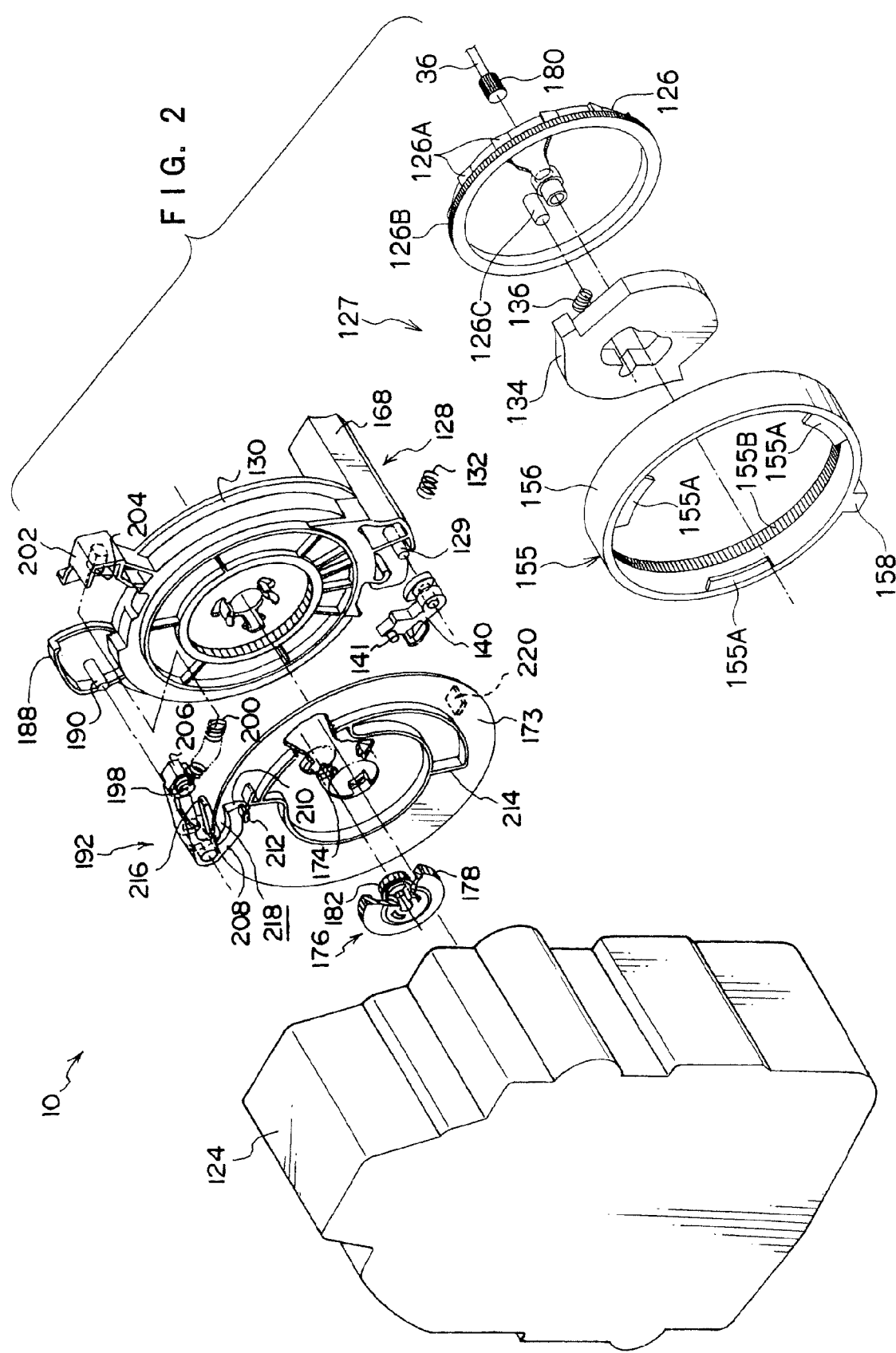
FIG. 2 is an exploded perspective diagram showing the configuration of a main portion of a webbing retracting device according to an embodiment of the present invention.
Figure 4:
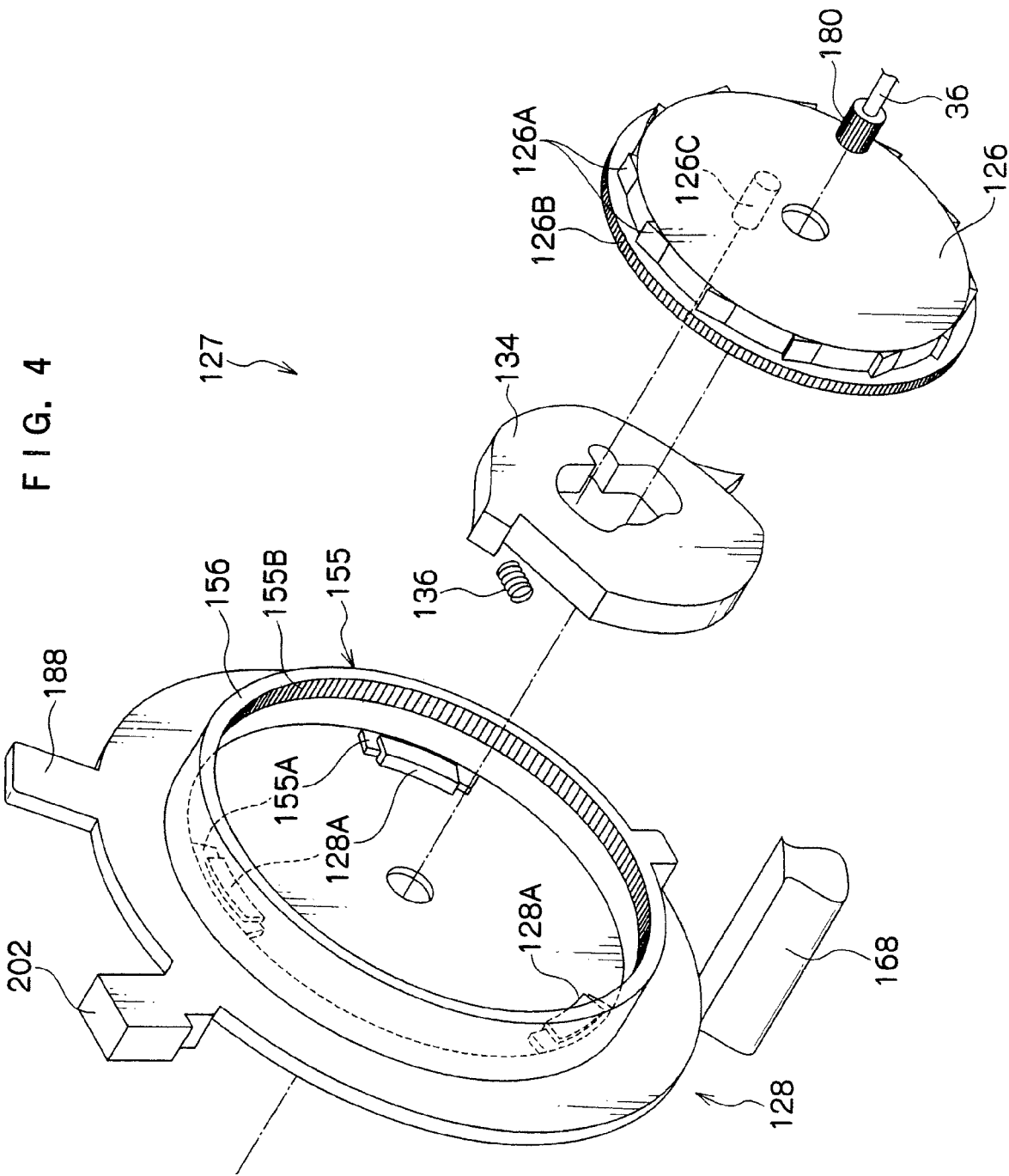
FIG. 4 is an exploded perspective diagram showing the configuration of a main portion of a webbing retracting device according to an embodiment of the present invention.

As is shown in FIG. 2, showing the configuration between the V gear 126 and the sensor cover 124 of FIG. 1, a rotation detection mechanism 127 is provided on the inside of the V gear 126. The rotation detection mechanism 127 is provided with a ring 155 as a ring-shaped member. As is shown in FIG. 4 and FIG. 5, plural (for example 3, as illustrated) flanges 155A are formed at a predetermined spacing on an edge of an inner peripheral portion of the ring 155 on the sensor gear 128 side. These flanges 155A are nipped between plural (for example 3, as illustrated) claws 128A that are provided on the body 130 at the inner peripheral side relative to the flanges 155A and the body 130.

There is a spacing gap here, between the distal end portion of the flanges 155A and the base portion of the claws 128A, and resilient material 151 of sponge or the like is fitted into this spacing. Due to this the ring 155 is rotatable relative to the sensor gear 128 and also able to move relative to the sensor gear 128 in a radial direction, but, since the ring 155 is biased by the resilient material 151 toward the inside radial direction, the ring 155 is also able to return to its initial position.

The edge portion of the inner peripheral portion of the ring 155, on the sensor holder 122 side, faces toward the ratchet teeth 126B of the V gear 126. Ratchet teeth 155B are formed in a continuous manner at this edge portion, and the ratchet teeth 155B are engagable with the ratchet teeth 126B.

Also, as is shown in FIG. 2, FIG. 4, and FIG. 5 the rotation detection mechanism 127 is provided with a W mass 134 as a ring-shaped member moving mechanism. The W mass 134 is provided at the inner radial direction of the V gear 126, and is axially supported by a pin 126C formed on the V gear 126 at a position displaced relative to the axial center of the torsion shaft 36 so that the W mass 134 is able to swing around an axis parallel to the torsion shaft 36.

Figure 6:
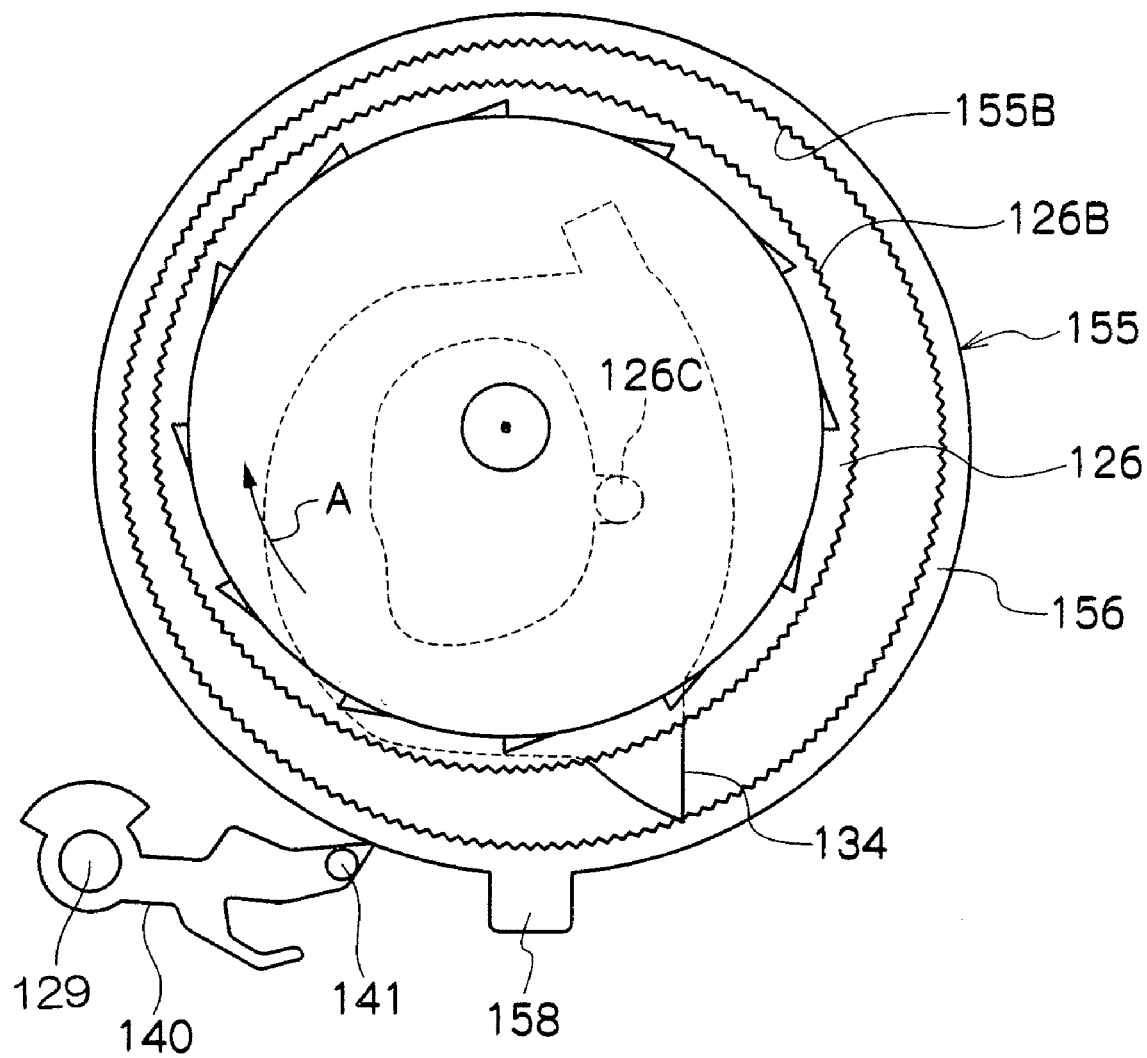
FIG. 6 is a front view showing an inertial movement condition of a mass.
Figure 7:
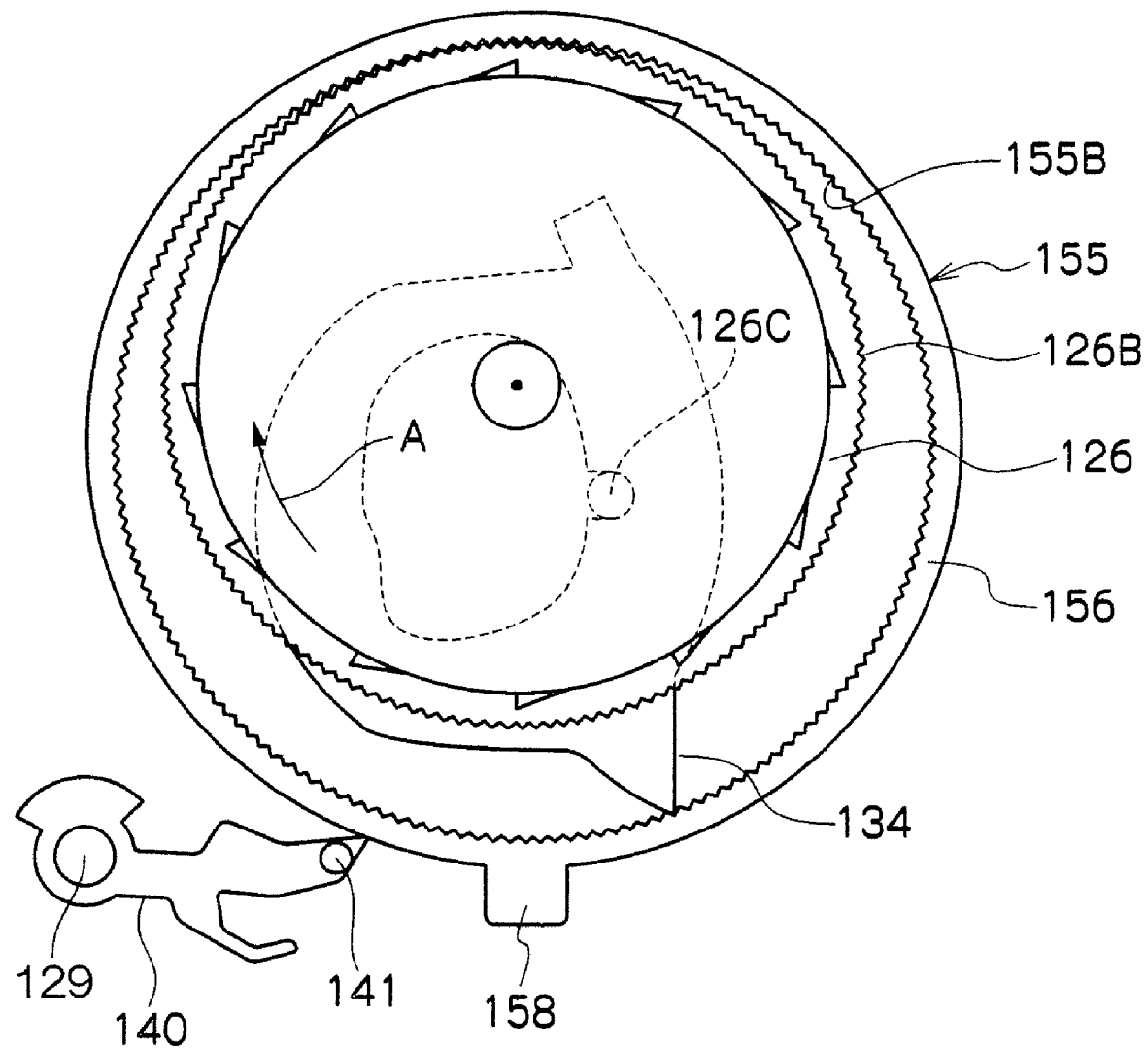
FIG. 7 is a front view showing a ring that has been displaced due to the inertial movement of the mass corresponding to FIG. 6.

The structure is such that the W mass 134, by the swinging movement thereof, contacts or moves away from the inner peripheral portion of the ring 155. As shown in FIG. 6, when the W mass 134 is in a state in which a protruding portion thereof (swing movement end portion) is in contact with the inner peripheral portion of the ring 155, if the V gear 126 is rotating in the pull out direction (the direction of arrow A in the figure) then, as shown in FIG. 7, the ring 155 is pushed by the protruding portion of the W mass 134 and moved (decentered) in the direction of the protruding portion side of the W mass 134.

The amount of protrusion of the W mass 134 from the outer peripheral portion of the V gear 126 is made so that the movement of the ring 155 can be made greater than the radial distance D separating the ring 155 and the V gear 126 before the movement (decentering).

That is, in the path of the maximum movement of the ring 155 toward the protruding portion side of the W mass 134, the inner peripheral portion of the ring 155 contacts with the outer peripheral portion of the V gear 126, and the ratchet teeth 155B formed on the inner peripheral portion of the ring 155 become engaged with the ratchet teeth 126B formed on the outer peripheral portion of the V gear 126. Due to this, as shown in FIG. 8, the rotational force of the V gear 126 in the pull out direction is transmitted to the ring 155 through the W mass 134, and the ring 155 is rotated in the pull out direction.

Figure 9:
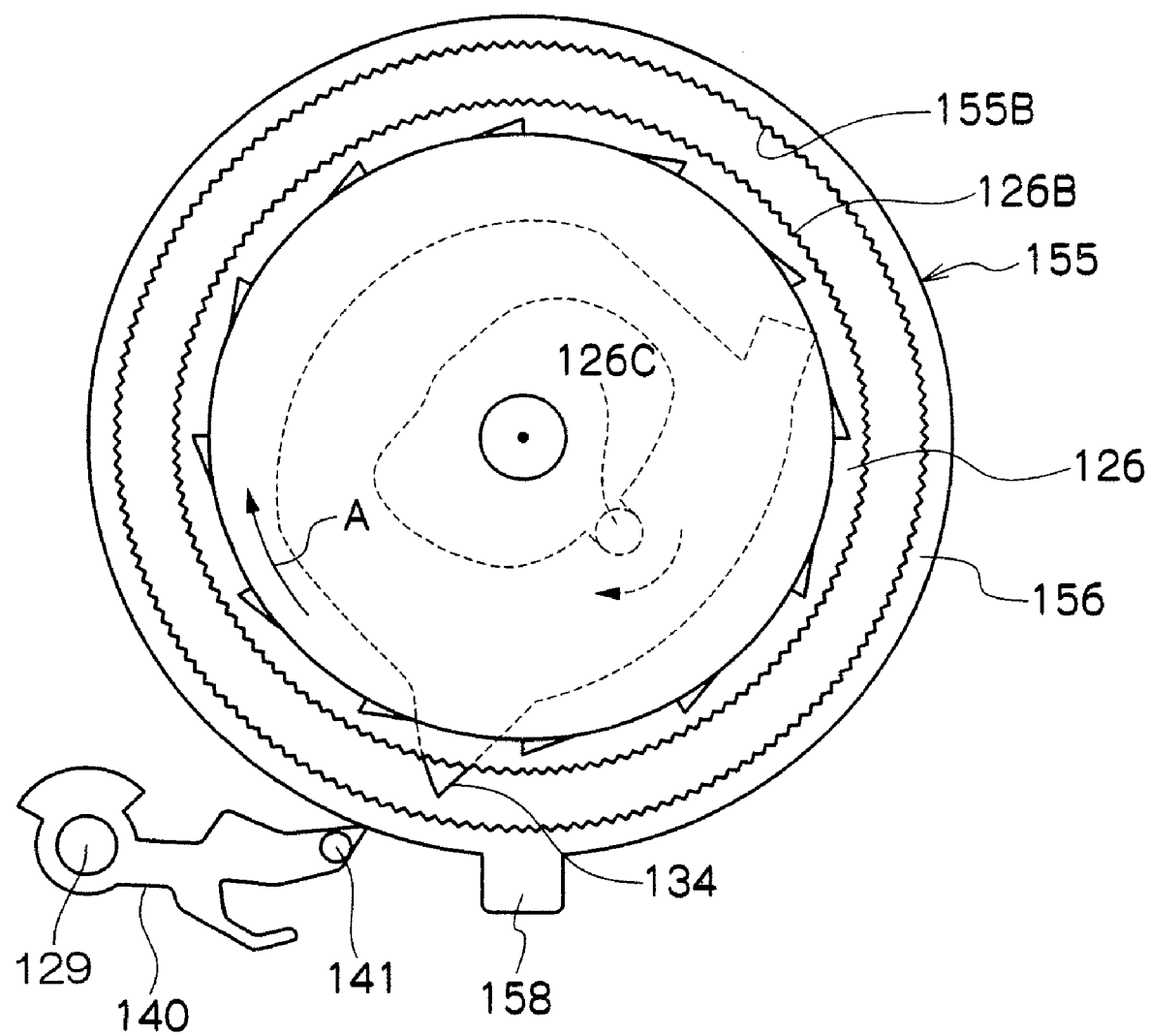
FIG. 9 is a front view showing the non inertial movement condition of the mass corresponding to FIG. 6.

In contrast, as shown in FIG. 9, if the V gear 126 is rotated in the pull out direction (the direction of arrow A in the figure) when the protruding portion of the W mass 134 is in a state of separation from the inner peripheral portion of the ring 155, then, since the rotational force of the in the pull out direction of the V gear 126 is not transmitted to the ring 155, the ring 155 maintains a stationary state.

Also, one end of a sensor spring 136 is attached to the W mass 134. The other end of the sensor spring 136 is attached to the V gear 126, and the W mass 134 is biased in the direction of separation from the internal peripheral portion of the ring 155.

Corresponding to the interlocking pawl 140, there is a pressing portion 158 on a body 156 of the ring 155. The end of the pressing portion 158 is located toward the radial outside direction with respect to the body 156.

When the body 156 rotates, in the path of the rotation of the pressing portion 158 is positioned an engagement pin 141 that is formed to protrude out from the distal end of the interlocking pawl 140 to the side that is opposite to the side of the V gear 126, and when, due to the rotation of the body 156 the pressing portion 158 contacts and pushes the engagement pin 141, the interlocking pawl 140 is pivoted so as to approach the vicinity of the outer peripheral portion of the V gear 126.

Furthermore, an acceleration sensor 142 is provided as an acceleration detecting mechanism below the interlocking pawl 140, as shown in FIG. 1. Corresponding to the acceleration sensor 142 there is a case shaped housing portion 144 formed on the sensor holder 122, the housing portion 144 being open to the sensor cover 124 side, and at least a portion of the acceleration sensor 142 is accommodated in the housing portion 144.

The acceleration sensor 142 is equipped with a base 146. The base 146 is formed in a flat plate shape, with the thickness direction thereof in the vertical direction. There is a curved surface formed on the top face of the base 146, the curved surface opening to the top, and a hard ball 148 is disposed as an inertial body on top of the curved surface. A sensor pawl 150 is provided above the hard ball 148.

The sensor pawl 150 is pivotally axially supported at the top edge of a vertical wall 152 that protrudes upwards from one portion of the outer periphery of the base 146, and the sensor pawl 150 is pushed upwards by the hard ball 148 rolling on the curved surface of the base 146. By the sensor pawl 150 being pushed up by the hard ball 148 the sensor pawl 150 contacts with the interlocking pawl 140 shown in FIG. 2 and pivots the interlocking pawl 140 so as to push it upwards.

At the pivoting side of the interlocking pawl 140 pivoted by the engagement with the sensor pawl 150 is disposed the above described V gear 126, and due to this the interlocking pawl 140 meshes with the V gear 126.

The lock mechanism 120, as shown in FIG. 1, is provided with a lock pawl 160. The lock pawl 160 is provided with a shaft 162. The axial direction of the shaft 162 is a direction parallel to (in the same direction as) the axial direction of the spool 24, and one end thereof is pivotally axially supported in a shaft receiving hole (omitted in the figure) formed in the leg plate 18.

A portion at the other end in the axial direction of the shaft 162 is pivotally axially supported in a shaft receiving hole 164 formed in the gear case 70. Also at this end in the axial direction of the shaft 162 is formed a pawl portion 166. The pawl portion 166 is a plate shaped member that has a thickness direction that is in the axial direction of the shaft 162, and ratchet teeth are formed on a portion of the outer periphery of the pawl portion 166.

A lock base 170 is provided in the pivoting radial direction of the shaft 162 on the pawl portion 166 side. The lock base 170 is provided with an insertion portion 171. The insertion portion 171 is formed in a circular rod shape, and fits into a portion at the other end of the through hole 28 of the spool 24 so as to be rotatable coaxially relative to the spool 24.

The insertion portion 171, and consequently the lock base 170, is passed through coaxially in a rotation fixed state by the torsion shaft 36, and rotates integrally and coaxially with respect to the torsion shaft 36.

A ratchet portion 172 is formed integrally to the insertion portion 171 at the leg plate 16 side thereof. The ratchet portion 172 is formed to be coaxial with respect to the insertion portion 171, and there are ratchet teeth formed intermittently on a portion of the outer periphery of the ratchet portion 172.

By pivoting the shaft 162 of the above lock pawl 160 in the pull out direction, the ratchet teeth of the pawl portion 166 mesh with the ratchet teeth of the ratchet portion 172. In the state of meshing of the pawl portion 166 with the ratchet portion 172, the rotation of the ratchet portion 172, and consequently the rotation of the lock base 170, is restricted.

The structure is such that the pressing portion 168 of the sensor gear 128 shown in FIG. 2 corresponds with the pawl portion 166, and when the body 130 of the sensor gear 128 turns in the pull out direction, the pressing portion 168 presses the pawl portion 166, and the lock pawl 160 is pivoted in the pull out direction.

As shown in FIG. 2, a cam plate 173 is disposed on the opposite side of the sensor gear 128 to the side of the V gear 126. The cam plate 173 is formed in a substantially circular plate shape, and is rotatably coaxially supported by the torsion shaft 36.

Furthermore, a circular hole 174 is positioned displaced toward the outside in the radial direction from the center of the cam plate 173, and a speed-reduction gear 176 is axially supported so as to be rotatably about an axis that is parallel to that of the spool 24. The speed-reduction gear 176 is provided with a gear portion 178. The gear portion 178 is an external toothed spur gear, and is positioned at the opposite side of the cam plate 173 to the side of the sensor gear 128. A gear 180 is provided corresponding to the gear portion 178 at the leading end side of the torsion shaft 36. The number of teeth on the gear 180 is less than the number on the gear portion 178, and mesh with the gear portion 178 provided coaxially and integrally with respect to the torsion shaft 36.

The speed-reduction gear 176 is provided with a gear portion 182. The gear portion 182 is formed to be integral and coaxial with respect to the gear portion 178, and has a sufficiently fewer number of teeth than the gear portion 178. The gear portion 182 is located at the sensor gear 128 side of the cam plate 173.

Figure 3:
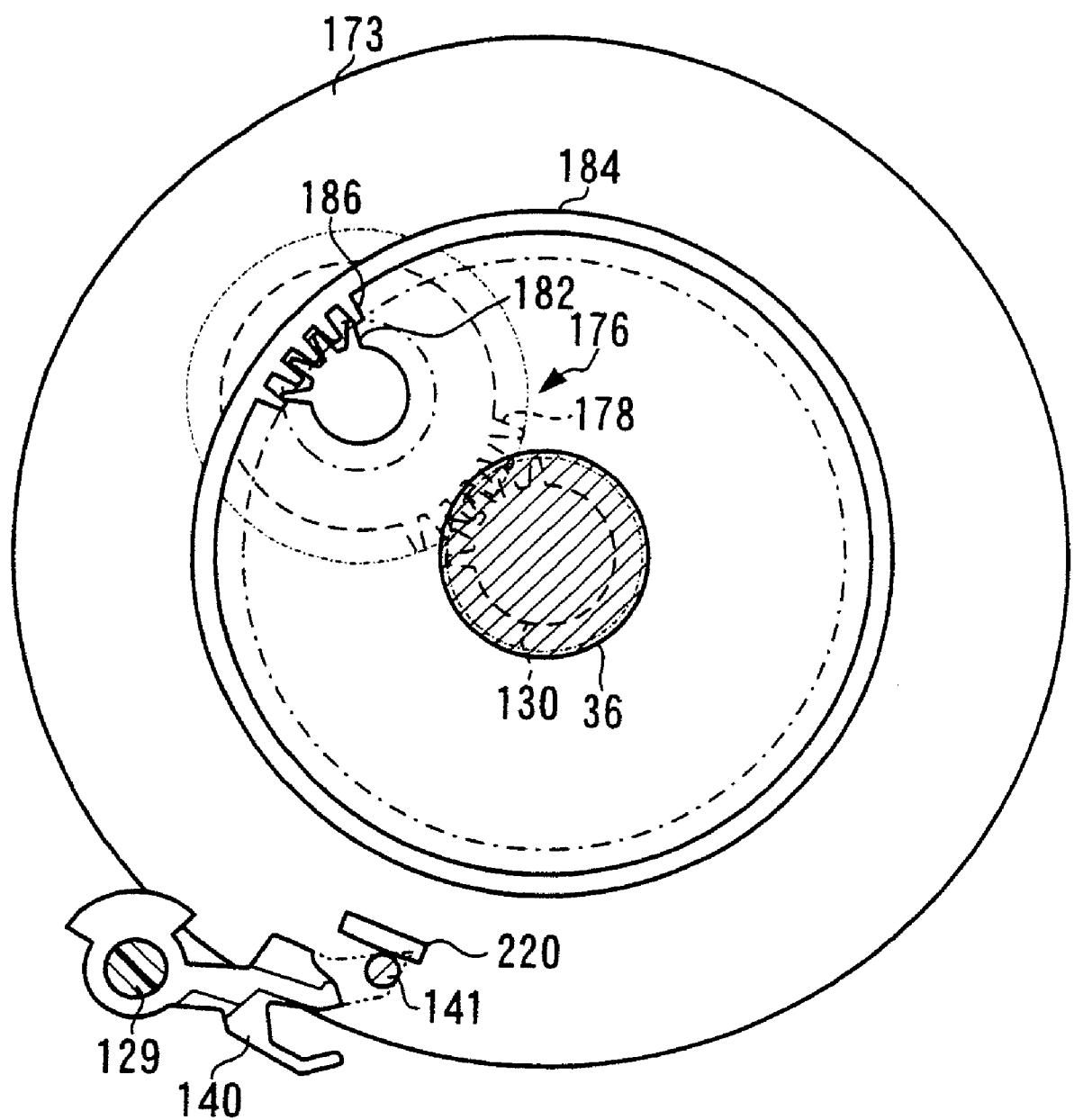
FIG. 3 is front view showing a state in which a restricting member is restricting displacement of an interlocking member.

As shown in FIG. 3, a rib 184 is formed on the sensor gear 128 side face of the cam plate 173 so as to be coaxial with respect to the spool 24. At an inner peripheral portion of the rib 184 there is formed an internal toothed gear 186 that has a sufficiently greater number of teeth than the gear portion 182, and the gear 186 is meshed with the gear portion 182.

Therefore, when the spool 24, and consequently also the torsion shaft 36, rotates about its own axis, this rotational force is speed-reduced by the gear 180, gear portion 178, gear portion 182 and gear 186, and transmitted to the cam plate 173. In doing so the cam plate 173 is rotated about the torsion shaft 36.

The rotation direction of the cam plate 173 coupled to the rotation of the torsion shaft 36 in the pull out direction will be referred to below as "cam pull out direction", and the rotation direction of the cam plate 173 coupled to the torsion shaft 36 in the take up direction will be referred to below as "cam take up direction".

Furthermore, as seen in FIG. 2, a lever housing portion 188 is formed on the body 130, approximately on the opposite side to the pressing portion 168, with the body 130 of the sensor gear 128 therebetween. A shaft 190 is formed protruding out from the lever housing portion 188 toward the opposite side to the side of the V gear 126 and the shaft 190 is parallel to the spool 24.

An ALR change-over lever 192 is pivotally axially supported at the shaft 190. An attachment protrusion 198 is formed at a distal end portion of the ALR change-over lever 192. One end of a coil spring 200 is attached to the attachment protrusion 198. The other end of the coil spring 200 is attached to a retaining protrusion 204 of a spring retaining portion 202 formed on the body 130.

When, for example, the ALR change-over lever 192 is in a state in which the attachment protrusion 198 is positioned between the axial support portion at the shaft 190 and the retaining protrusion 204, the ALR change-over lever 192 is in a neutral position, and, with the neutral position as a boundary, when the ALR change-over lever 192 pivots around the shaft 190 in the engagement direction that is the direction of rotation toward the rotational axial center side of the sensor gear 128, or when the ALR change-over lever 192 pivots in the release direction that is the direction opposite to the engagement direction, a biasing force of the coil spring 200 biases the ALR change-over lever 192 toward the respective pivoting direction side, and causes further pivoting.

Further, as shown in FIG. 2, an interlocking pawl 206 is formed from a distal end of the ALR change-over lever 192 facing the side of the V gear 126. The interlocking pawl 206 is located at an outer peripheral portion side of the V gear 126 passing between the spring retaining portion 202 and the lever housing portion 188. When the ALR change-over lever 192 pivots about the shaft 190 toward the rotational axial center side of the sensor gear 128 (that is toward the torsion shaft 36 side), the interlocking pawl 206 meshes with the V gear 126.

A contact portion 210 is formed protruding from a distal end of the ALR change-over lever 192 and facing to the rotational axial center side of the cam plate 173. A cam protrusion 212 and a cam wall 214 are formed in correspondence to the contact portion 210 on the face of the cam plate 173 that is opposite to the side of the sensor gear 128.

The cam protrusion 212 is formed such that it is contactable with the contact portion 210 at the cam take up direction side and from the distal end side of the ALR change-over lever 192, and such that the cam protrusion 212 contacts the contact portion 210 when the spool 24, and consequently the torsion shaft 36, is rotated up to just before all of the webbing belt 30 that was taken up on the spool 24 has been pulled out.

In contrast, the cam wall 214 is formed such that it is contactable with the contact portion 210 from the cam pull out direction side in the state in which the ALR change-over lever 192 has been pivoted to the engagement direction side. Furtheremore, the cam wall 214 contacts the contact portion 210 when the spool 24, and consequently the torsion shaft 36, is rotated up to the point when a certain amount of webbing remains, just before the webbing belt 30 is taken up to full storage on the spool 24.

A stopper 220 is provided configuring a restricting member as a restricting portion, as shown in FIG. 2, on the cam plate 173. The stopper 220 is a plate shaped portion that extends toward the sensor gear 128 side from a portion at the outer periphery of the cam plate 173. Furthermore, as shown in FIG. 3, the stopper 220 is formed in a position such that in the rotational position of the cam plate 173 corresponding to the condition of full storage, when all of the webbing belt 30 has been taken up on the spool 24, the stopper 220 faces the engagement pin 141 of the interlocking pawl 140.

In the condition in which the stopper 220 and the engagement pin 141 are facing each other, if the interlocking pawl 140 tries to pivot toward the outer peripheral portion side of the V gear 126 then the stopper 220 obstructs the engagement pin 141, and pivoting of the interlocking pawl 140 is restricted.

21 Operation And Effect Of The Present Invention>

Next, the operation and the effect of the webbing retracting device 10 according to the present invention will be explained.

In the present webbing retracting device 10, when, in the state in which the webbing belt 30 is taken up on the spool 24, the webbing belt 30 is pulled to the distal end side against the biasing of the spiral spring 40, then as the webbing belt 30 is gradually pulled out, the spool 24 rotates in the pull out direction.

In such a manner the pulled out webbing belt 30 is placed around the body of an occupant and, for example, by retaining a tongue plate provided in an intermediate portion in the lengthwise direction of the webbing belt 30 in a buckle device provided at the side of a vehicle seat, the fastened state is arrived at in which the body of the occupant wears the webbing belt 30, and the body of an occupant is restrained by the webbing belt 30.

In the state in which the webbing belt 30 is fastened, when a vehicle is in a state of rapid deceleration, the hard ball 148 consequently rolls, and the sensor pawl 150 is pushed up by the hard ball 148. The sensor pawl 150, pushed up in such a manner, is rotated such that it engages with the interlocking pawl 140 of the sensor gear 128 and pushes up the interlocking pawl 140. In so doing the interlocking pawl 140 meshes with the V gear 126.

When the body of an occupant moves in a direction substantially toward the front of the vehicle, by the inertia as a vehicle decelerates, the webbing belt 30 is suddenly pulled by the body of the occupant. In this manner, by the webbing belt 30 being suddenly pulled, rotational force is suddenly applied to the spool 24 in the pull out direction.

In principle, the spool 24 rotating in the pull out direction, rotates the torsion shaft 36, and consequently the V gear 126, in the pull out direction, and, as shown in FIG. 9, the W mass 134 rotates with the V gear 126 in the pull out direction. However, as shown in FIG. 6, when the spool 24 is rotated suddenly in the pull out direction, as above, the W mass 134 does not rotate and attempts to maintain its position, due to inertia.

By such an action, the W mass 134 relatively pivots with respect to the V gear 126 against the biasing force of the sensor spring 136. By this relative pivoting of the W mass 134, the protruding portion of the W mass 134 contacts with an inner peripheral portion of the ring 155. Then, as shown in FIG. 7, the ring 155 is moved in a radial direction, and the ratchet teeth 155B, formed on the internal periphery of the ring 155 at the opposite radial direction side, mesh with the ratchet teeth 126B formed on the outer periphery of the V gear 126.

By interlocking the ring 155 to the V gear 126, the rotational force of the spool 24 is transmitted through the torsion shaft 36 and the V gear 126 to the ring 155, and the ring 155 together with the V gear 126 rotates in the pull out direction.

When the ring 155 has rotated a predetermined angle in the pull out direction, the pressing portion 158 contacts the engagement pin 141 of the interlocking pawl 140, and presses the engagement pin 141.

In such a manner, the interlocking pawl 140 is pivoted by the engagement pin 141 being pushed by the pressing portion 158, and the interlocking pawl 140 meshes with the V gear 126.

When the interlocking pawl 140 meshes with the V gear 126, as described above, the rotational force of the spool 24 in the pull out direction is transmitted through the torsion shaft 36, the V gear 126 and the interlocking pawl 140 to the sensor gear 128, and due to this the sensor gear 128 is rotated in the pull out direction.

When the sensor gear 128 rotates by a certain angle in the pull out direction against the biasing force of the return spring 132, the pressing portion 168 provided on the sensor gear 128 presses the pawl portion 166 of the lock pawl 160, and the pawl portion 166 is pivoted about the shaft 162.

When the pawl portion 166 pivots in such a manner about the shaft 162, the pawl portion 166 meshes with the ratchet portion 172 of the lock base 170, and rotation in the pull out direction of the lock base 170, and consequently of the spool 24, is restricted. Due to this, the body of an occupant, which is trying to inertially move in an approximately forward direction of the vehicle, may be held, restrained with certainty.

In contrast, when a child seat is fixed with webbing belt 30 in a seat of a vehicle mounted with the webbing retracting device 10 of the present invention, all of the webbing belt 30 is pulled out.

When the webbing belt 30 is pulled out and the spool 24 is rotated in the pull out direction, the torsion shaft 36 is rotated in the pull out direction, and by doing so the gear 180 is rotated in the pull out direction. The rotation of the gear 180 in the pull out direction is transmitted to the cam plate 173 through the gear portions 178 and 182, and the gear 186, and the cam plate 173 is rotated in the cam pull out direction.

When the cam plate 173 is thus rotated in the cam pull out direction, the cam protrusion 212 approaches, from the cam take up direction side, the vicinity of the contact portion 210 of the ALR change-over lever 192 that is in the separation position. Next, when the spool 24, and consequently the torsion shaft 36, reach a rotational position that is just before all of the webbing belt 30 that was wound up on the webbing belt 30 has been pulled out, the cam protrusion 212 contacts the contact portion 210.

When the spool 24 is rotated further in the pull out direction from this state, the cam protrusion 212 presses the contact portion 210, and the ALR change-over lever 192 is pivoted, against the biasing force of the coil spring 200, more to the engagement direction side than the neutral position of the ALR change-over lever 192. However, in this state, there is no actual pivoting of the ALR change-over lever 192 up until the position where the interlocking pawl 206 meshes with the V gear 126.

In this way, in the state in which all of the webbing belt 30 has been pulled out, the webbing belt 30 is placed around specific positions of the child seat mounted on the vehicle seat. In this state, the tongue plate is engaged in the buckle device and retained therein. Further, the child seat is held by the webbing belt 30 and fixed in the vehicle seat by taking up the slack portion of the webbing belt 30 onto the spool 24.

By taking up the slack portion of the webbing belt 30 in the above way, the spool 24 rotates in the take up direction, and the ALR change-over lever 192 pivots further in the engagement direction by the biasing force of the coil spring 200. Due to this the interlocking pawl 206 meshes with the V gear 126.

Therefore, when the spool 24 is rotated in the pull out direction from this state, the sensor gear 128, together with the V gear 126, turn in the pull out direction. When the sensor gear 128 turns in the pull out direction, the pawl portion 166 of the lock pawl 160 is pressed by the pressing portion 168, and the pawl portion 166 is pivoted about the shaft 162. Due to this the pawl portion 166 meshes with the ratchet portion 172 of the lock base 170, restricting rotation of the lock base 170, and consequently of the spool 24.

Since pulling out of the webbing belt 30 is restricted by rotation of the spool 24 in the pull out direction being restricted in this manner, the child seat may be fixed with certainty in the vehicle seat, with no slacking of the webbing belt 30 that is tightened and fixing the child seat.

Furthermore, when releasing the tongue plate from the buckle device and removing the webbing belt 30 from the child seat, the spool 24 is rotated in the take up direction by the biasing force of the spiral spring 40, and the webbing belt 30 is taken up on the spool 24.

By rotation of the spool 24, and consequently of the torsion shaft 36, in such a way the cam plate 173 rotates in the cam take up direction. When the cam plate 173 rotates in the cam take up direction, the cam wall 214 approaches from the cam take up direction to the vicinity of the contact portion 210 in the state in which the ALR change-over lever 192 is positioned in the engagement position.

When the spool 24 reaches the rotational position that is just before the state of full storage of the webbing belt 30, the cam wall 214 contacts the contact portion 210. When, further, the spool 24 rotates in the take up direction from this state up to the rotational position of the state when the webbing belt 30 is fully stored, the cam wall 214 is pressed by the contact portion 210.

Due to this the ALR change-over lever 192 pivots against the biasing force of the coil spring 200 more to the separation direction side than the neutral position of the ALR change-over lever 192. By doing so the ALR change-over lever 192 pivots to the separation position. The interlocking pawl 206 is separated from the V gear 126 by this pivoting of the ALR change-over lever 192 to the separation position, and the meshing of the interlocking pawl 206 with the V gear 126 is released.

There are, however, also occasions when, before fastening the webbing belt 30, an abrupt rotational force in the pull out direction is applied to the spool 24, by an occupant pulling on the webbing belt 30 in order to pull the webbing belt 30 out.

In such a situation, as explained above, the ratchet teeth 126B formed on the outer periphery of the V gear 126 mesh with the ratchet teeth 155B formed on the internal periphery of the ring 155, and the rotational force of the spool 24 in the pull out direction attempts to rotate the V gear 126 together with the ring 155 in the pull out direction. Consequently, in such a case the interlocking pawl 140 is pressed by the pressing portion 158.

Here, in the condition in which the webbing belt 30 is fully stored, as shown in FIG. 3, the stopper 220 faces toward the engagement pin 141 of the interlocking pawl 140. Due to the fact that the stopper 220 is formed on the cam plate 173, by the rotating of the spool 24 in the pull out direction the cam plate 173 also rotates.

However, since the rotation of the spool 24 is transmitted to the cam plate 173 with sufficient speed reduction, if it is a state just after pulling the webbing belt 30, since the rotation amount of the spool 24 is also small, the amount of rotation of the cam plate 173 is sufficiently small.

Therefore, in a state just after pulling the webbing belt 30 in order to pull out the webbing belt 30, while the cam plate 173 does rotate by a very small amount, the state of the stopper 220 opposing the engagement pin 141 is not disengaged.

In such a state, even if the interlocking pawl 140 attempts to pivot to the vicinity of the V gear 126 due to the engagement pin 141 being pressed by the pressing portion 158, the stopper 220 opposing the engagement pin 141 obstructs on the pivoting side of the interlocking pawl 140. Due to this, the interlocking pawl 140 is not able to mesh with the V gear 126.

Therefore, in this state there is no rotation of the sensor gear 128 in the pull out direction, consequently the pawl portion 166 of the lock pawl 160 is not able to mesh with the ratchet portion 172 of the lock base 170.

Due to this, effective prevention may be made of generation of so called "endlock", restriction of the rotation of the spool 24 in the pull out direction, in states of full storage of the webbing belt 30 and just after initiating pulling out of the webbing belt 30.

Also, if, the hard ball 148 rolls because of some sort of impact, in the state in which the webbing belt 30 is fully stored, or the state just after initiation of the pulling out of the webbing belt 30, then even if the hard ball 148 attempts to pivot the interlocking pawl 140 via the sensor pawl 150, the pivoting of the interlocking pawl 140 is restricted by the stopper 220.

That is, in the present embodiment, as long as there is a portion of the stopper 220 that faces the interlocking pawl 140, there is no occurrence of endlock, even if the rotation detection mechanism 127 or the acceleration sensor 142 are actuated.

Also, prevention of endlock from the actuation of the rotation detection mechanism 127, and prevention of endlock from the actuation of the acceleration sensor 142, are both carried out by the stopper 220 restricting the pivoting of the interlocking pawl 140. Therefore, the mechanism for preventing endlock may be effectively simplified, even though prevention of endlock is possible both when the rotation detection mechanism 127 is actuated and the acceleration sensor 142 is actuated. By doing so, increase in weight accompanying an increase in the number of parts may be extremely effectively suppressed, and the present webbing retracting device 10 may be made compact.

Figure 10:
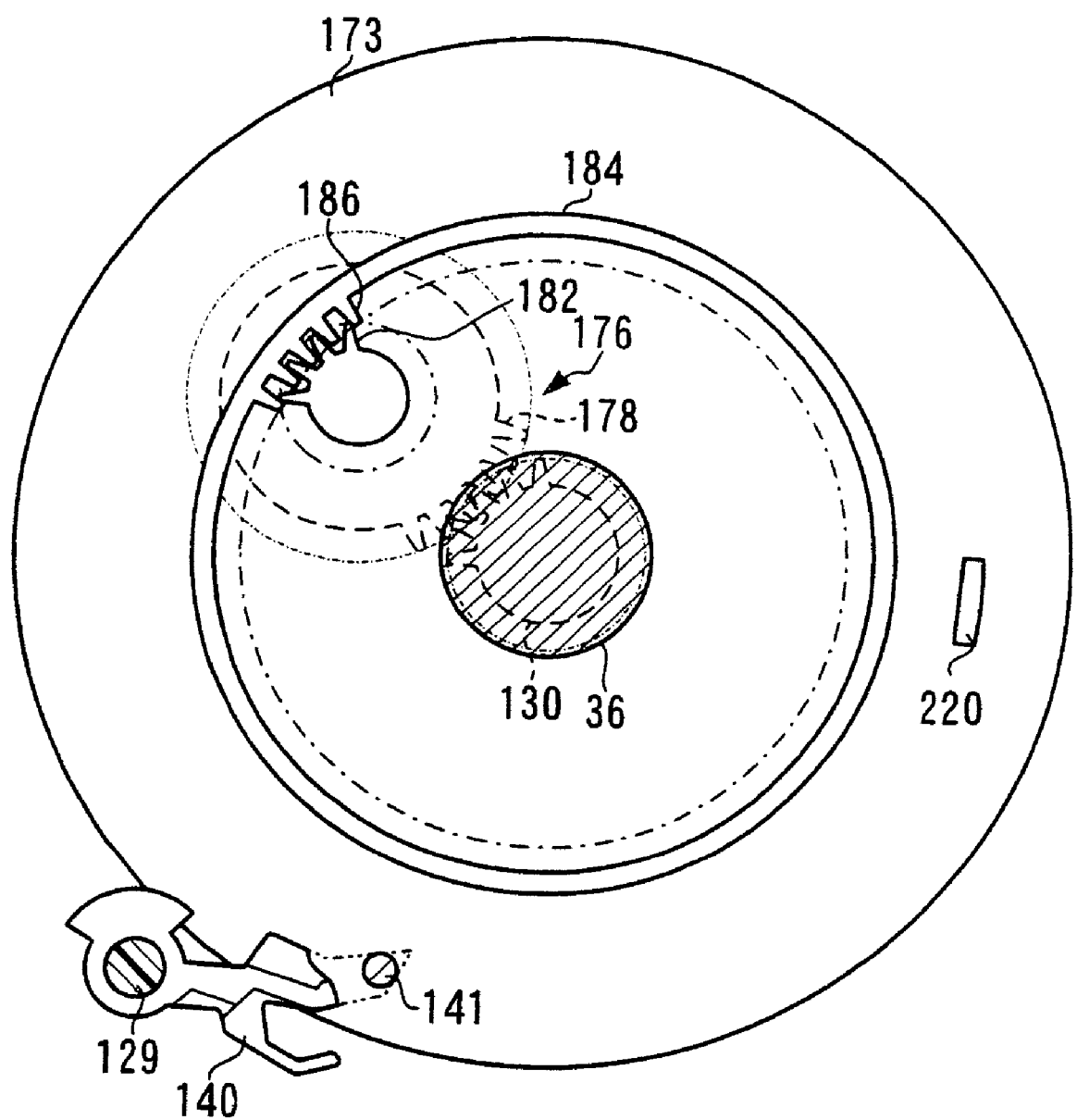
FIG. 10 is a front view showing a state in which the displacement restriction of the interlocking member by the restricting member has been unlocked.

Furthermore, when the spool 24 rotates in the pull out direction, pulled by the webbing belt 30, as shown in FIG. 10, the cam plate 173 rotates. By this rotation of the cam plate 173 the opposing state of the stopper 220 and the engagement pin 141 is disengaged.

Here, the angle rotated by the cam plate 173 due to the rotation of the spool 24, from the state in which the webbing belt 30 is fully stored up to the state when all of the webbing belt 30 has been pulled out (the state in which all of the webbing belt 30 has been pulled out from the spool 24), is 360° or less. Therefore, after the disengagement of the facing state of the stopper 220 and the interlocking pawl 140, by the rotation of the spool 24 in the pull out direction, even when the webbing belt 30 is pulled out to its furthest extent, the stopper 220 does not oppose the engagement pin 141.

Therefore, after pulling out the webbing belt 30, if the vehicle becomes in a state of rapid deceleration, and the webbing belt 30 is suddenly pulled out, the pawl portion 166 of the lock pawl 160 can be made to mesh with the ratchet portion 172 of the lock base 170, and rotation of the spool 24 in the pull out direction may be restricted with certainty.

Also, the mechanism for rotating the stopper 220, coupling the rotation to the rotation of the spool 24, is basically, after the webbing belt 30 is in a state of being fully pulled out, the mechanism for pivoting the ALR change-over lever 192. In this way, the mechanism for pivoting the ALR change-over lever 192 may be applied as the mechanism for rotating the stopper 220, and the configuration may be simplified extremely effectively. In this meaning too, an increase in weight accompanying an increase in the number of parts may be extremely effectively suppressed, and the present webbing retracting device 10 may be made compact.

As explained above using an example embodiment, in the webbing retracting device of the present invention, in coupling a interlocking member to rotation of a first rotational body, it is sufficient simply to regulate displacement in the rotational radial direction of the ring member first rotational body, and, a mechanism for detecting a condition in which webbing belt is suddenly pulled out from a spool may be simplified compared to conventional webbing retracting devices, and cost may be reduced.

Also, as the mechanism for regulating displacement in the rotational radial direction of the ring shaped member rotational body employs a mass that is also provided in conventional webbing retracting devices, an increase in the number of parts by providing such a device compared to conventional webbing retracting devices may be prevented, and the overall number of parts of the webbing retracting device may be reduced.

It should be noted, that while in the present embodiment the interlocking member was caused to engage with the rotational body, and was indirectly engaged with the spool, it is possible to make the interlocking member engage directly with the spool.

What is claimed is:

1. A webbing retracting device comprising:
   a spool having a proximal end portion of a long band-shaped webbing belt attached thereto, the spool taking up and storing the webbing belt when rotated in a take up direction that is one direction about the spool axis, and the webbing belt being pulled out by pulling the webbing belt toward the distal end side thereof such that the spool is rotated in a pull out direction that is a direction opposite to the take up direction;

a first rotational body, the first rotational body being coaxially and integrally rotatable with the spool;

a ring member encircling the first rotational body, the ring member being rotatable and being able to be displaced in a radial direction between a separation position, in which an inner peripheral portion of the ring member is separated from an outer peripheral portion of the first rotational body, and a contact position, in which the inner peripheral portion of the ring member is in contact with the outer peripheral portion of the first rotational body;

a ring member moving mechanism including an inertial body that, in an inertial movement condition due to sudden rotation of the first rotational body, moves the ring member from the separation position to the contact position, wherein the inertial body is supported by the first rotational body so as to be relatively pivotable with respect to the first rotational body; in the inertial movement condition, the inertial body relatively pivots with respect to the first rotational body and displaces toward the outside in the radial direction of the first rotational body, moving the ring member to the contact position; and when not in the inertial movement condition, the inertial body is out of contact with the ring member;

a second rotational body that is coaxially relatively rotatable with respect to the spool;

an interlocking member axially supported on the second rotational body and configured to be rotatable between a position of engagement with an outer peripheral portion of the ring member and a position in which the engagement is released, the interlocking member, due to the ring member rotating in the pull out direction, being rotated and engaging with the ring member when the ring member displaces to the contact position, and rotating the second rotational body in the pull out direction; and a lock mechanism including a third rotational body that is connected to and integrally rotated with the spool, and a pawl member having a pawl portion that is engagable with the third rotational body, the lock mechanism being configured such that due to the rotation of the second rotational body in the pull out direction, a portion of the second rotational body abuts and rotates the pawl member such that the pawl portion engages with the third rotational body, whereby rotation of the third rotational body is restricted, wherein the ring member is movable relative to the second rotational body in a radial direction due to a resilient member being disposed therebetween.

2. The webbing retracting device of claim 1, wherein the ring member moving mechanism comprises a biasing member that biases the inertial member in the pull out direction.

3. The webbing retracting device of claim 1, wherein the ring member moving mechanism comprises: a support shaft that protrudes from a position distanced from the center of rotation of the first rotational body, parallel to the rotational axis of the first rotational body; and an inertial body, pivotally supported by the support shaft.

4. The webbing retracting device of claim 3, wherein the ring member is provided at the inner peripheral portion thereof with an internal peripheral surface that has ratchet teeth formed thereon, and the inertial body comprises a protrusion portion, and when there is a sudden rotation of the spool in the pull out direction, the protrusion portion engages with the ratchet teeth and moves the ring member so as to contact the first rotational body.

5. The webbing retracting device of claim 1, wherein the ring member moving mechanism further comprises a biasing member that biases the inertial member in the pull out direction, whereby the inertial member is held in the separation position.

* * * * *